United States Patent
Jeuk et al.

(10) Patent No.: US 10,911,533 B2
(45) Date of Patent: Feb. 2, 2021

(54) LEVERAGING GOAWAY MESSAGES TO DYNAMICALLY INFORM CONNECTION PEERS OF IOT EVENTS

(71) Applicant: Cisco Technology, Inc., San Jose, CA (US)

(72) Inventors: Sebastian Jeuk, Munich (DE); Gonzalo A. Salgueiro, Raleigh, NC (US); M. David Hanes, Lewisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/360,863

(22) Filed: Mar. 21, 2019

(65) Prior Publication Data

US 2020/0304568 A1    Sep. 24, 2020

(51) Int. Cl.
*H04L 29/08* (2006.01)
*H04L 29/06* (2006.01)
*H04L 29/12* (2006.01)

(52) U.S. Cl.
CPC ........ *H04L 67/1044* (2013.01); *H04L 69/161* (2013.01); *H04L 61/6059* (2013.01); *H04L 69/329* (2013.01)

(58) Field of Classification Search
CPC .............. H04L 67/1044; H04L 69/161; H04L 61/6059; H04L 69/329
See application file for complete search history.

(56) References Cited

U.S. PATENT DOCUMENTS

| | | |
|---|---|---|
| 2006/0171404 A1 | 8/2006 | Nalawade et al. |
| 2008/0301246 A1 | 12/2008 | Gkantsidis et al. |
| 2010/0169961 A1 | 7/2010 | Huh et al. |
| 2015/0067154 A1* | 3/2015 | Ly .......................... H04L 67/26 709/224 |
| 2015/0071139 A1* | 3/2015 | Nix ......................... H04L 9/088 370/311 |
| 2018/0176862 A1* | 6/2018 | Malas ..................... H04L 67/12 |
| 2018/0262419 A1 | 9/2018 | Ludin et al. |
| 2019/0158899 A1* | 5/2019 | Sakai ................. H04N 21/2662 |
| 2019/0357109 A1* | 11/2019 | Hong .................... H04W 76/19 |
| 2020/0120555 A1* | 4/2020 | Patil .................... H04L 63/0428 |

OTHER PUBLICATIONS

Amante, et al., "IPv6 Flow Label Specification", Internet Engineering Task Force (IETF)—Request for Comments: 6437, 15 pages, Nov. 2011, IETF Trust.

(Continued)

*Primary Examiner* — Mohamed A. Wasel
(74) *Attorney, Agent, or Firm* — Behmke Innovation Group LLC; Kenneth J. Heywood; Jonathon P. Western

(57) ABSTRACT

In one embodiment, an Internet of Things (IoT) device in a network establishes connections with a plurality of peers. The device identifies an event involving the IoT device. The device generates a GOAWAY message that includes metadata regarding the event within a metadata field of the message. The GOAWAY message indicates that the IoT device is not accepting new connections. The device sends the GOAWAY message to one or more of the peers.

20 Claims, 7 Drawing Sheets

(56) References Cited

OTHER PUBLICATIONS

Belshe, et al., "Hypertext Transfer Protocol Version 2 (HTTP/2)", HTTPbis Working Group—Internet-Draft, <draft-ietf-httpbis-http2-latest>, 58 pages, May 30, 2015, IETF Trust.

Bishop, M., "Hypertext Transfer Protocol (HTTP) over QUIC", QUIC Internet-Draft, <draft-ietf-quic-http-13>, 39 pages, Jun. 28, 2018, IETF Trust.

Iyengar, et al., "QUIC: A UDP-Based Multiplexed and Secure Transport", QUIC—Internet-Draft, <draft-ietf-quic-transport-01>, Section 7.10., 48 pages, Jan. 14, 2017, IETF Trust.

Iyengar, et al., "QUIC: A UDP-Based Multiplexed and Secure Transport", QUIC—Internet-Draft, <draft-ietf-quic-transport-13>, 121 pages, Jun. 28, 2018, IETF Trust.

"Supplemental Document: BIG-IP 13.0.1 Fixes and Known Issues", https://support15.com/kb/en-us/products/big-ip_Itm/releasenotes/related/relnote-supplement-bigip-13-0-1.html#A677119-2, 573 pages, Mar. 28, 2018, AskF5.

"QUIC", online, https://en.wikipedia.org/wiki/QUIC, dated Feb. 21, 2019, printed Feb. 26, 2019, 6 pages, Wikimedia Foundation, Inc.

* cited by examiner

LEVERAGING GOAWAY MESSAGES TO DYNAMICALLY INFORM CONNECTION PEERS OF IOT EVENTS

TECHNICAL FIELD

The present disclosure relates generally to computer networks, and, more particularly, to leveraging GOAWAY messages to dynamically inform connection peers of Internet of Things (IoT) events.

BACKGROUND

The Internet of Things, or "IoT" for short, represents an evolution of computer networks that seeks to connect many everyday objects to the Internet. Notably, there has been a recent proliferation of "smart" devices that are Internet-capable such as thermostats, lighting, televisions, cameras, and the like. In many implementations, these devices may also communicate with one another. For example, an IoT motion sensor may communicate with one or more smart lightbulbs, to actuate the lighting in a room, when a person enters the room.

In many of the applications for IoT devices, such as connected vehicles, smart cities, factory automation, etc., reliable device behavior within an IoT area (e.g., a 5G cell, etc.) is key for adequate information exchange. For example, a battery powered IoT sensor may enter into a sleep mode after taking and reporting a sensor reading. If this sleep behavior is not known to the application, the device going into sleep mode can be disruptive. However, there is very little that allows devices to use data plane protocols, as opposed to control plane protocols, to signal IoT events to a peer.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
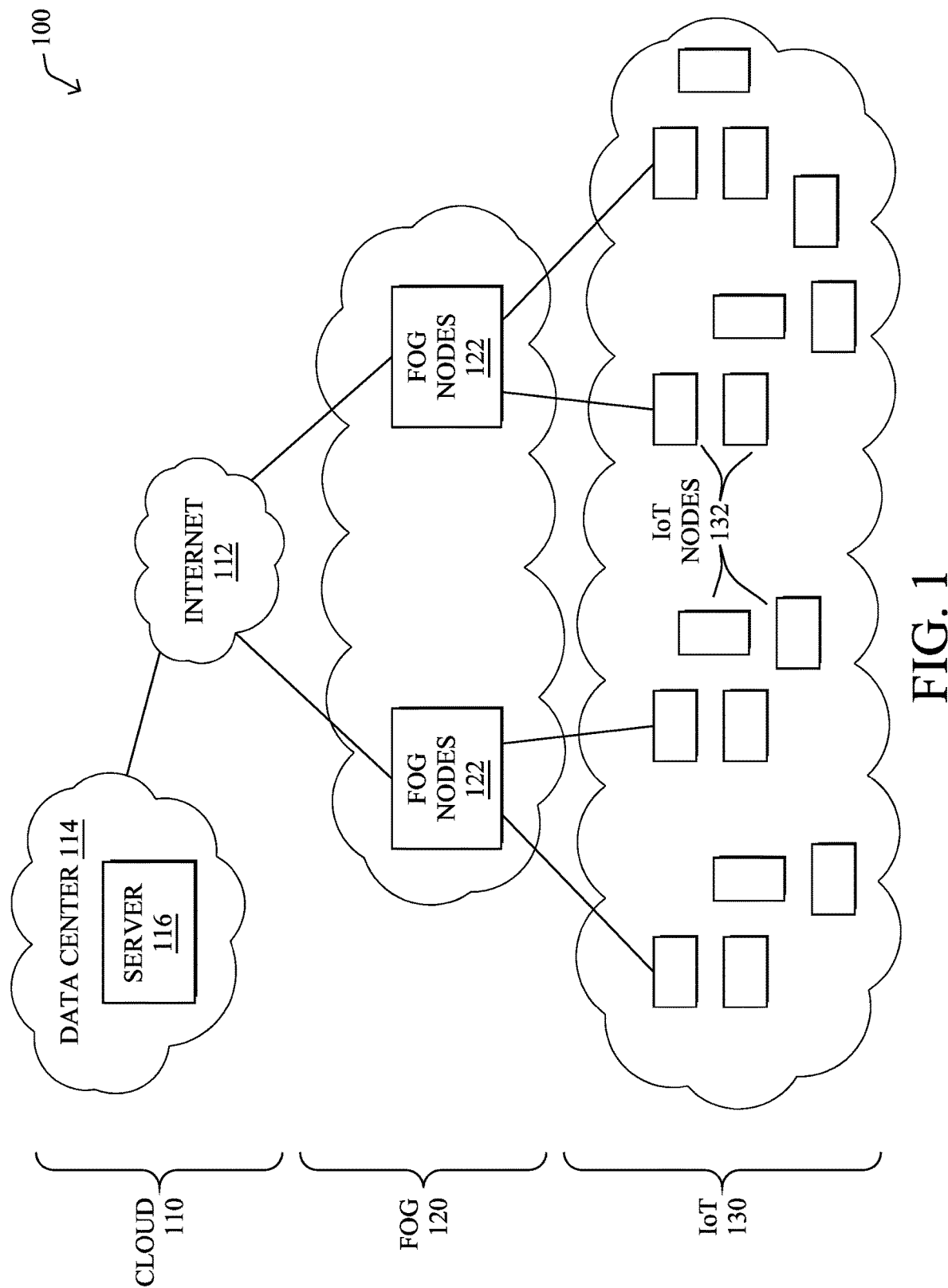
FIG. 1 illustrates an example communication network.

According to one or more embodiments of the disclosure, an Internet of Things (IoT) device in a network establishes connections with a plurality of peers. The device identifies an event involving the IoT device. The device generates a GOAWAY message that includes metadata regarding the event within a metadata field of the message. The GOAWAY message indicates that the IoT device is not accepting new connections. The device sends the GOAWAY message to one or more of the peers.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

FIG. 1 is a schematic block diagram of an example simplified communication network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT device 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Figure 2:
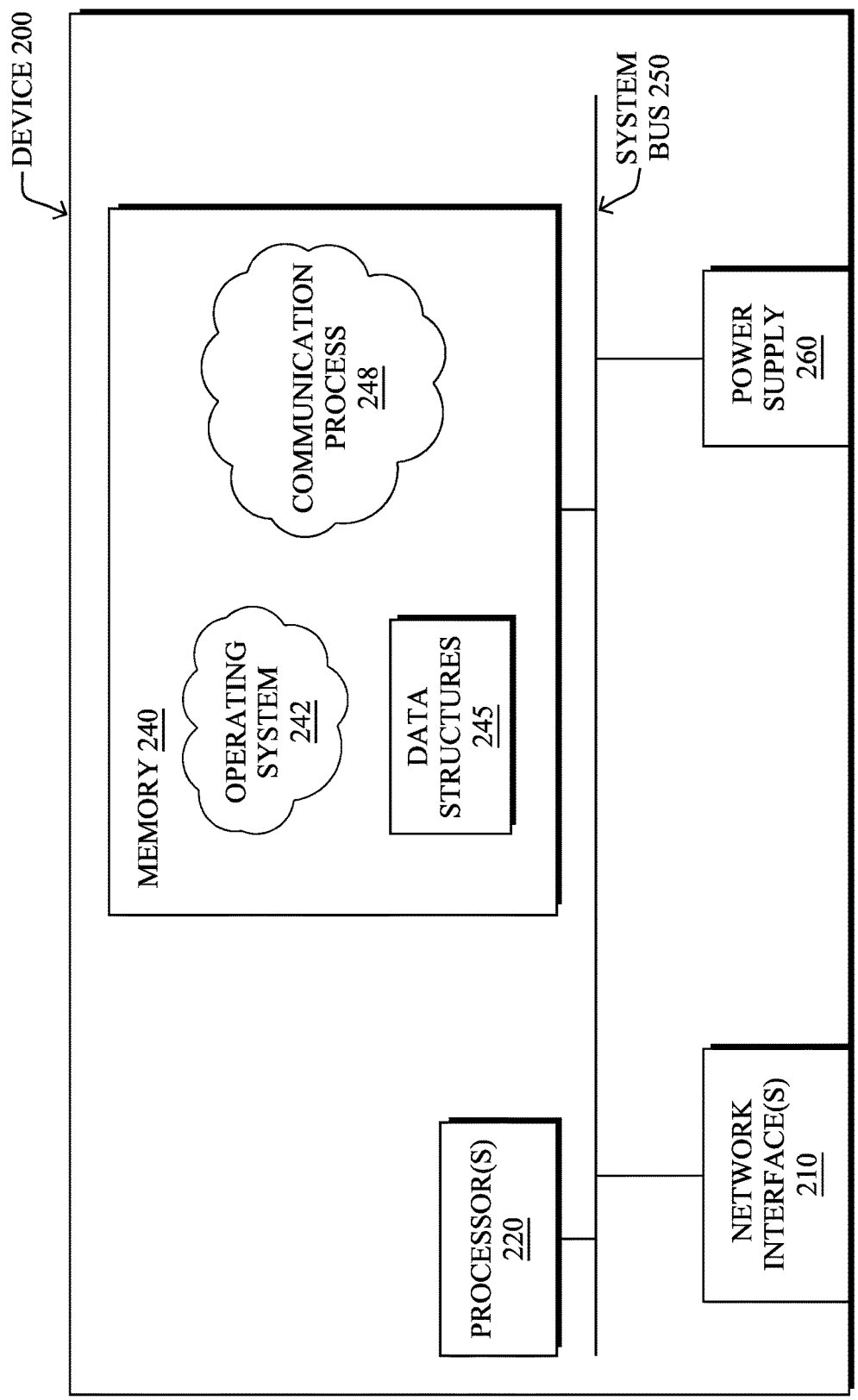
FIG. 2 illustrates an example network device/node.

FIG. 2 is a schematic block diagram of an example node/device 200 that may be used with one or more embodiments described herein, e.g., as any of the computing devices shown in FIG. 1. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a communication process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

As noted above, in many of the newly "connected" anything applications (e.g., connected transportation, connected vehicles, smart cities, mining, factories, etc.) being able to rely on the behavior of a device within an IoT area is key for adequate information exchange. Today, there are multiple ways to 'prepare' for IoT events such as roaming, sleep modes, or disconnection due to battery depletion, and the like. However, there is very little that allows devices to use data plane protocols, as opposed to control plane protocols, to signal IoT events to a peer.

Leveraging GOAWAY Messages to Dynamically Inform Connection Peers of IoT Events

The techniques herein allow for the signaling of flow changes and tear downs associated with IoT events across multiple connections via a single GOAWAY notification. Multiple protocols can be used to implement the techniques herein such as QUIC, the Hypertext Transfer Protocol (HTTP), and IPv6. In further aspects, the notification may also include metadata about the IoT event, to communicate additional context and information to the peers of the affected device.

Specifically, according to one or more embodiments of the disclosure as described in detail below, an Internet of Things (IoT) device in a network establishes connections with a plurality of peers. The device identifies an event involving the IoT device. The device generates a GOAWAY message that includes metadata regarding the event within a metadata field of the message. The GOAWAY message indicates that the IoT device is not accepting new connections. The device sends the GOAWAY message to one or more of the peers.

Illustratively, the techniques described herein may be performed by hardware, software, and/or firmware, such as in accordance with the communication process 248, which may include computer executable instructions executed by the processor 220 (or independent processor of interfaces 210) to perform functions relating to the techniques described herein.

Operationally, the techniques herein allow IoT devices to use the data plane to notify its communication peers of an IoT-related event using a customized GOAWAY message. The concept of a GOAWAY message was first introduced in the Internet Engineering Task Force (IETF) draft entitled "QUIC: a UDP-Based Multiplexed and Secure Transport,"

by Iyengar et al. In general, the QUIC protocol provides an alternative to using the Transport Layer Protocol (TCP) for web applications. More specifically, under TCP, if any of the multiplexed data streams encounter an error, the entire connection may be treated as failed. QUIC attempts to alleviate these issues by multiplexing connections using UDP and letting the QUIC driver handle errors, instead of the transmission protocol. In addition, QUIC supports including keying information within the initial handshake, as opposed to Transport Layer Security (TLS), which requires a separate handshake to secure the connection.

Early drafts of the QUIC specification introduce a GOAWAY message that an endpoint can send to a peer, prior to sending a CONNECTION_CLOSE message. Such a GOAWAY message notify the peer that the connection will soon be terminated, any active streams will still be processed, and the endpoint will not initiate or accept any new streams with the peer. Under the proposal, a GOAWAY frame may include the following fields: a frame type field specifying that the frame is a GOAWAY frame, a 32-bit error code field that specifies the reason for closing the connection, a 32-bit last good stream ID field that was accepted by the endpoint, a 16-bit reason phrase length specifying the length of a reason phrase field, and the reason phrase field that optionally include a readable explanation as to why the connection was closed.

According to various embodiments, the techniques herein extend the concept of a GOAWAY message across multiple protocols and introduce a customized version of a GOAWAY that is tailored for use in IoT deployments. Such a customized GOAWAY message can provide additional information about the specific IoT event that led to the GOAWAY message being sent, as well as allowing multiple connections to be specified in a single GOAWAY message for which the GOAWAY message is valid.

It is important to note that the IoT is unique in the wide range of device types that the network needs to support. Indeed, some IoT devices have a relatively high level of compute power, while others are very constrained from a computational, power, and networking perspective. Therefore, depending on the device, the ability to support the GOAWAY concept being outlined herein is necessary. Higher-end devices are capable of supporting this GOAWAY concept in higher layer protocols, like HTTP or IPv6, while constrained devices could implement this idea using only QUIC.

Figure 3:
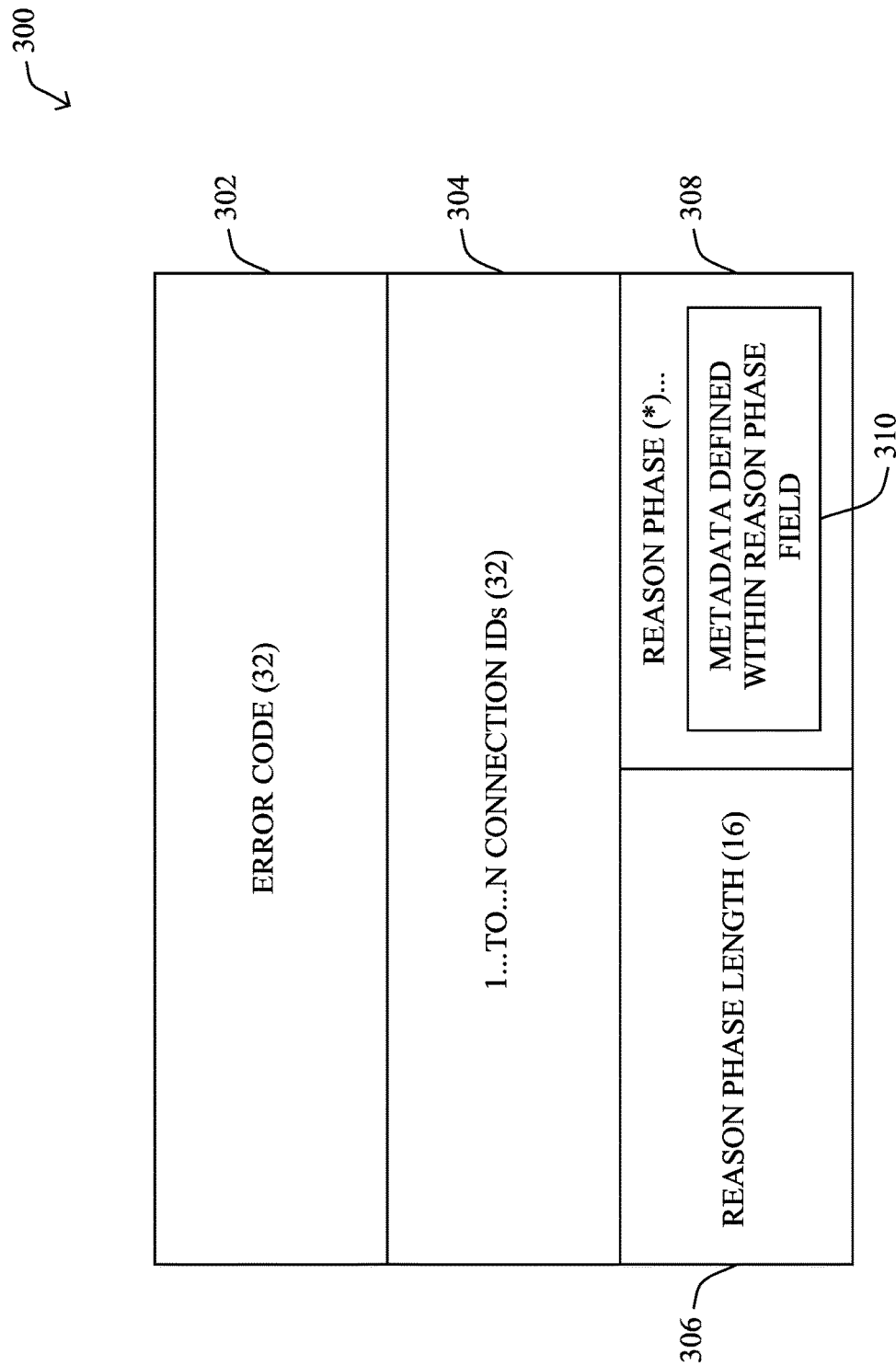
FIG. 3 illustrates an example GOAWAY message.

FIG. 3 illustrates an example GOAWAY message 300, in accordance with various embodiments herein. As shown, GOAWAY message 300 may be a QUIC GOAWAY frame that includes the following fields:

A 32-bit Error Code Field 302—In various embodiments, a new error code class called "IoT Events" or "IoT Errors" may be used to signify the IoT event that led to the sending of GOAWAY message 300. For example, such event/error codes may indicate any or all of the following:

IoT Sensor Roaming Event Imminent
IoT Sensor Accuracy Drop
IoT Sensor Validity Drop A 32-bit Connection ID Field 304—In various embodiments, the teachings herein also propose using field 304 to specify 1 to N number of connection IDs. In general, the connection IDs specified in field 304 define the flows/connections that are relevant/impacted by the IoT event. In other words, rather than using a Last Good Stream ID, the teachings herein propose listing the IDs of the potentially multiple connections for which the IoT event is relevant.

A 16-bit Reason Phrase Length Field 306—This field specifies the length of the reason phrase field 308.

A Variable-Length Reason Phrase Field 308—This field can be used to include metadata 310 regarding the IoT event/error indicated by message 300.

During operation, IoT devices with established connections may maintain a connection ID database, which should preferably be as lightweight as possible. Each connection ID in the database may be locally associated with the destination endpoints/peers of the IoT device. Hence, the IoT device knows at all times what the connection ID is for a specific flow and endpoint/peer. In various embodiments, the IoT device can then leverage this information for inclusion in the proposed connection ID field 304, based on the IoT event involved. Similarly, the IoT device can also include metadata 310 within reason phrase field 308, to inform the peers about the details of the event, such as timing information or the like.

As would be appreciated, QUIC is also compatible with HTTP and the IETF has recently renamed HTTP over QUIC as HTTP/3. Accordingly, an IoT device can also leverage the teachings herein to send a GOAWAY message to its peer(s) regarding an IoT event using HTTP/3. Under the current proposal, the HTTP frame structure over QUIC is currently defined as a single 3 byte field that identifies the QUIC stream ID and only specified in the direction of server to client. In contrast, the teachings herein propose a bidirectional implementation for HTTP over QUIC following the same frame format encompassing the error codes and other metadata shown in FIG. 3, essentially shifting this information up the stack.

In further embodiments, another example way to convey the GOAWAY message is through the use of IPv6 extension headers. Generally, IPv6 defines a set of extension headers that are capable of carrying metadata information. Here, a distinction can be made between the hop-by-hop and destination option extension header. Both are valid and can be used to convey the GOAWAY message, depending on the use case.

Figure 4:
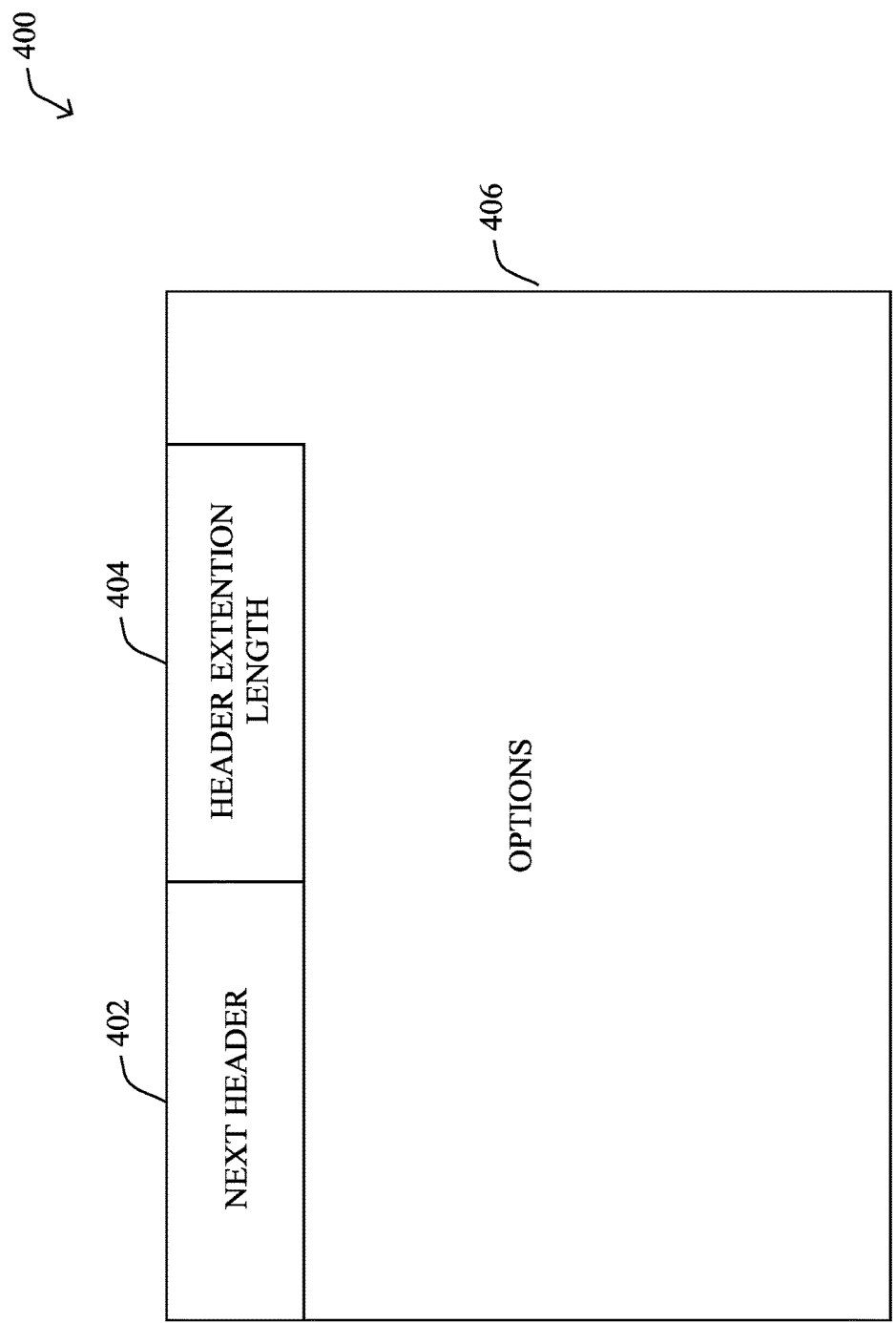
FIG. 4 illustrates an example hop-by-hop Internet Protocol version 6 (IPv6) extension header.

FIG. 4 illustrates an example hop-by-hop IPv6 extension header 400. As shown, header 400 may include the following: a next header field 402, a header extension length field 404, and options 406. Next header field 402 and header extension length field 404 will be common across all hop-by-hop extension headers. Here, the techniques herein focus on the options 406 portion of hop-by-hop IPv6 header 400. According to various embodiments, a GOAWAY message can also be conveyed in options 406 of header 400.

Figure 5:
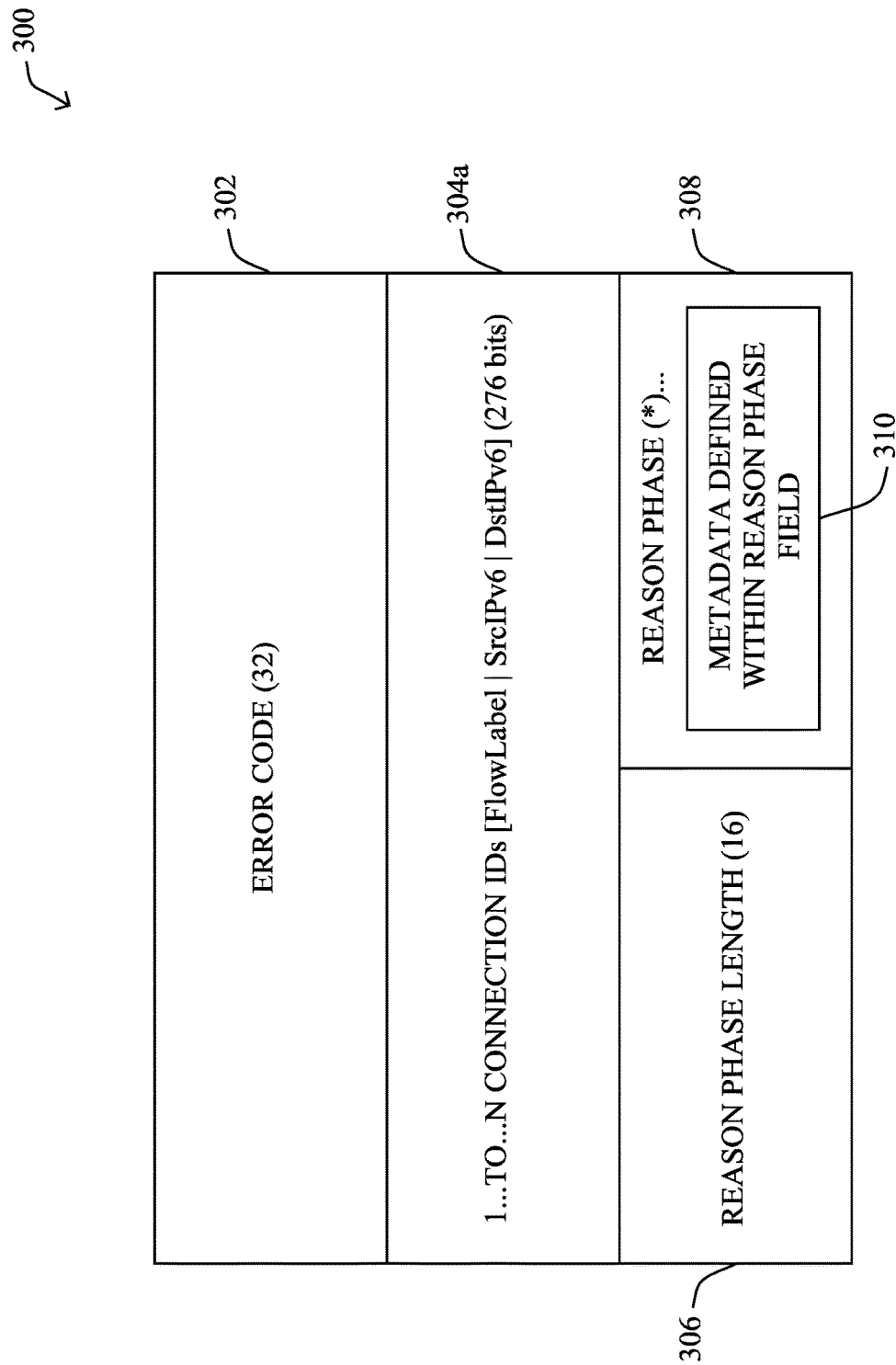
FIG. 5 illustrates an example GOAWAY message in an IPv6 extension header.

FIG. 5 illustrates an example of GOAWAY message 300 adapted for inclusion on in an IPv6 extension header, such as header 400. As shown in FIG. 5, GOAWAY message 300 may generally include the same error code field 302, reason phrase length field 306, and reason phrase field 308 in which metadata 310 regarding the IoT event/error associated with GOAWAY message 300.

While QUIC relies on a connection ID as a dedicated way to identify connections between end-points (beyond the typical 5-tuple), IPv6 can rely on different information, including the aforementioned 5-tuple but also a flow label. The flow label is a 20-bit identifier that labels packets belonging to a specific flow. In conjunction with the source and destination IP information, a specific connection can be identified. Accordingly, in various embodiments, when GOAWAY message 300 is conveyed via an IPv6 extension header, it may include a modified, 276-bit connection ID field 304a that uses the triplet of a flow label, source address, and destination address, to identify a specific connection between the IoT device and a peer.

The IPv6 functionality behaves very similar to the other behaviors described above with respect to QUIC and/or HTTP over QUIC. The only difference here is that IPv6 is not able to support the multiplexing capabilities like QUIC and HTTP do. However, by representing connection IDs as triplets of flow labels, source IPv6 address, and destination IPv6 address, a single GOAWAY message can be sent via IPv6 for multiple flows between two endpoints, further optimizing the graceful teardown of connections.

The GOAWAY notification is used to inform peers of established connections that an IoT event occurred that is potentially impacting any of the upper layer applications. In various embodiments, this notification can be sent over a single connection but can refer to multiple connection IDs for increased efficiency. While the authors of the IETF draft for QUIC suggest that the graceful shutdown of connections should be handled by the application directly, this is not valid for IoT devices and related environments. Instead, it is believe that the GOAWAY notification has its applicability within IoT environments as it provides a way to handle events within the IoT environment of which the application would not be aware. Furthermore, the ability to pass additional metadata regarding IoT events such as roaming, powering down, sleeping, and so on, provides additional context to the other endpoint that can be passed to other IoT network devices (e.g., fog controllers and management systems). Hence, the GOAWAY notifications proposed herein provide for the handling of IoT events gracefully with a single notification that optionally includes contextual metadata and event details.

The GOAWAY notification introduced herein would be triggered by the QUIC, HTTP/2, or IPv6 stack. During operation, the stack is getting its information from the IoT device and related control planes. For example, as soon as an IoT device (e.g., an IoT gateway on a connected vehicle) is in close proximity to a new 5G cell, it may inform the QUIC/HTTP-2/IPv6 stack and trigger a GOAWAY notification with an error code of "IoT Sensor Roaming Event Imminent." The IoT device is able to inform its peers based on locally stored information about connection ID and endpoint information tuples. The proposed message format also provides the flexibility to be explicit about which of the one or more peers of the device are informed about the IoT event.

Figure 6:
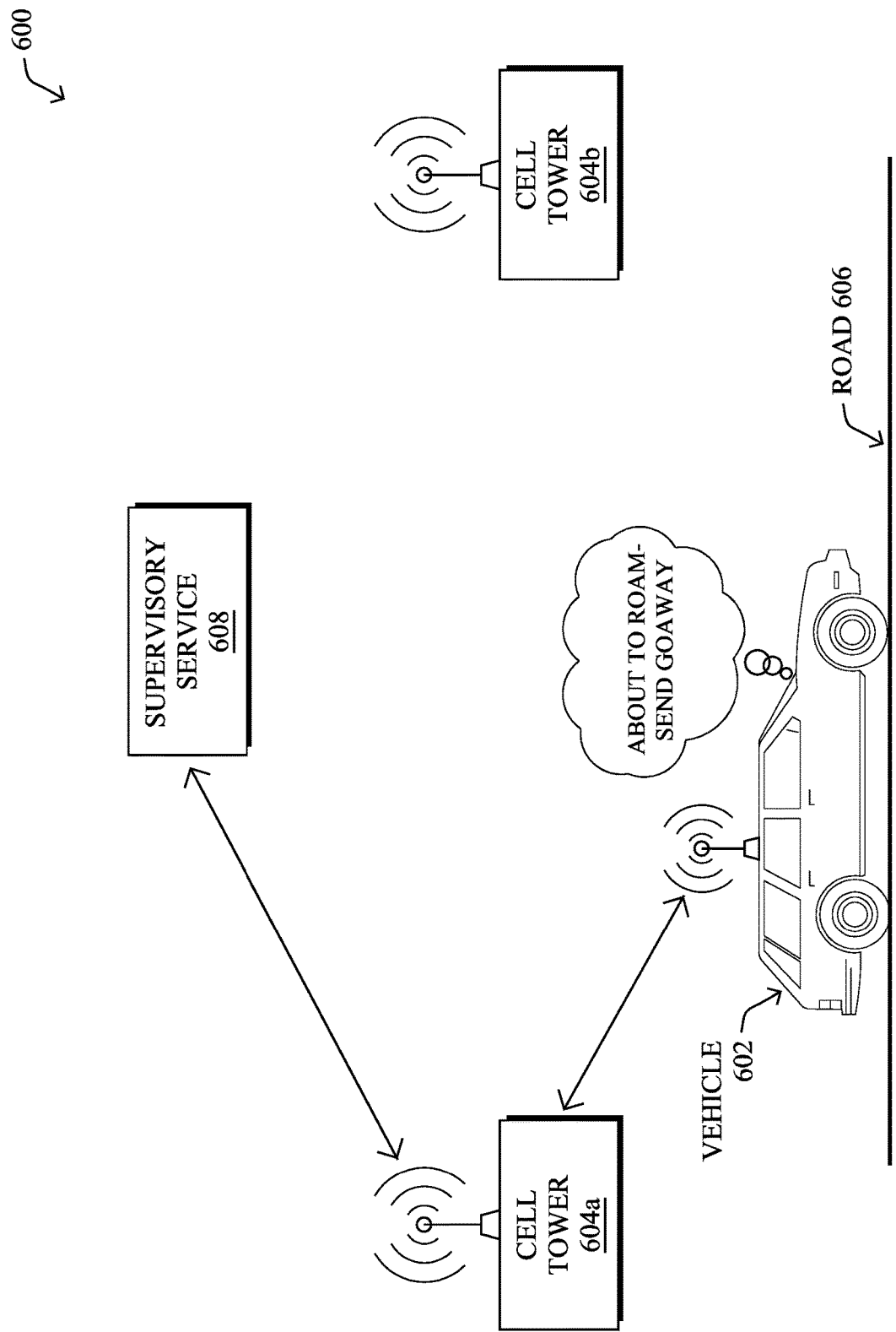
FIG. 6 illustrates an example device roaming event.

FIG. 6 illustrates an example device roaming event, in accordance with the teachings herein. As shown, a communication system 600 may include any or all of the following components: a vehicle 602, a first 5G cell tower 604a and a second 5G cell tower 604b, as well as a remote supervisory service 608. Generally, vehicle 602 may be any form of vehicle configured to move from one physical location to another such as, but not limited to, cars, buses, trucks, boats, trains, aerial vehicles, and the like. In many cases, vehicle 602 may be configured to transport people and/or cargo. Further, vehicle 602 may be an autonomous vehicle, semi-autonomous vehicle, or manually-operated vehicle, according to the various embodiments herein.

In some embodiments, vehicle communication system 600 may be a specific implementation of communication network 100, described previously with respect to FIG. 1. Notably, supervisory service 608 may be implemented at the cloud layer 110, such as at a particular server 116 in a data center 114 or, alternatively, across multiple servers 116, such as part of a cloud-based service. Similarly, cell towers 604a-604b may implement a fog computing layer 120, while vehicle 602 may be viewed as an IoT node 132 at IoT layer 130. Thus, vehicle 602 may communicate directly with cell towers 604a-604b via other IoT nodes 132 (e.g., other vehicles, etc.), in some cases. In further implementations, cell towers 604a-604b may be road side units (RSUs) configured to use a different wireless communication protocol, such as Wi-Fi or the like.

Cell towers 604a-604b may provide connectivity between vehicle 602 and supervisory service 608 via a WAN, such as the Internet 112 or another WAN. For example, cell towers 604a-604b may communicate with supervisory service 608 by leveraging a hardwired network connection, cellular or other wireless connection, satellite connection, or the like.

As would be appreciated, vehicle 602 may comprise its own local network, to allow the various components of vehicle 602 to communicate with one another. For example, vehicle 602 may comprise any number of sub-networks, such as a Controller Area Network (CAN) bus, an IP network, etc., to allow the various systems of vehicle 602 to communicate with one another. Such system may include, but are not limited to, an engine control unit (ECU), a battery management system (BMS) that manages the local battery of vehicle 602, an advanced driver assistance system (ADAS) system, and the like. A local gateway of vehicle 602 may provide communicative connectivity between the local network of vehicle 602 and other devices. For example, the local gateway of vehicle 602 may provide wireless connectivity to cell towers 604a-604b located within communication range of road 606 on which vehicle 602 is traveling.

To illustrate the teachings herein, assume that a roaming event involving vehicle 602 is imminent (e.g., vehicle 602 travels away from tower 604a towards tower 604b). In such a case, only sessions going out of vehicle 602 should be informed of the roaming event. All other connections that stay local to vehicle 602 do not need to be made aware of the roaming event. Accordingly, the gateway of vehicle 602 may generate and send a GOAWAY message (e.g., via QUIC, HTTP, IPv6, etc.) to the selected recipient peer(s) of vehicle 602, such as supervisory service 608. Conversely, if the IoT event of vehicle 602 indicates a reduction of sensor accuracy, the corresponding GOAWAY message may inform both internal and external session peers of vehicle 602. For example, if road salt blurs images captured by a camera of vehicle 602, the gateway of vehicle 602 may send the corresponding GOAWAY message to both supervisory service 608 and to internal systems of vehicle 602, such as a hazard avoidance system.

Said differently, within a connected automotive environment, many IoT sensors are leveraged to continuously exchange highly critical information (e.g., car health, proximity, weather, road conditions, etc.). This information, and its criticality, gets even more relevant in autonomous vehicle environments in which vehicles can also share information with one another. In such cases, the GOAWAY notification introduced herein can be used to gracefully handle errors/events within the IoT environment, without having the application to handle/understand these individually. For example, an autonomous vehicle can use a GOAWAY notification to inform other nearby vehicles of a roaming event (e.g., the vehicle is about to take an exit off the highway, etc.). In turn, the other vehicles can use this notification to adjust how they handle data from the vehicle. For example, if the other vehicles rely on real-time sensor data from the roaming vehicle, they may lower their data expectations from the vehicle. In one embodiment, the GOAWAY message may even include a back-off time as metadata that other peers of the vehicle can use as a threshold to handle information received from the vehicle differently, such as ignoring data from the vehicle entirely during the back-off time or apply a different weighting to the data.

Of course, the GOAWAY notification introduced herein can work in more traditional scenarios where multiple connections are created between IoT endpoints or a single connection is created with multiplexed streams. With multiple connections, the source device can send the GOAWAY message over a single connection and identify the applicable connections via the connection ID parameter. For multiplexed streams, a single GOAWAY could still be used, but there would be more dependence on an intelligent middle layer device, like a fog controller or IoT pole-top router, to inform the other connection endpoints/peers specified in the GOAWAY about the event.

Figure 7:
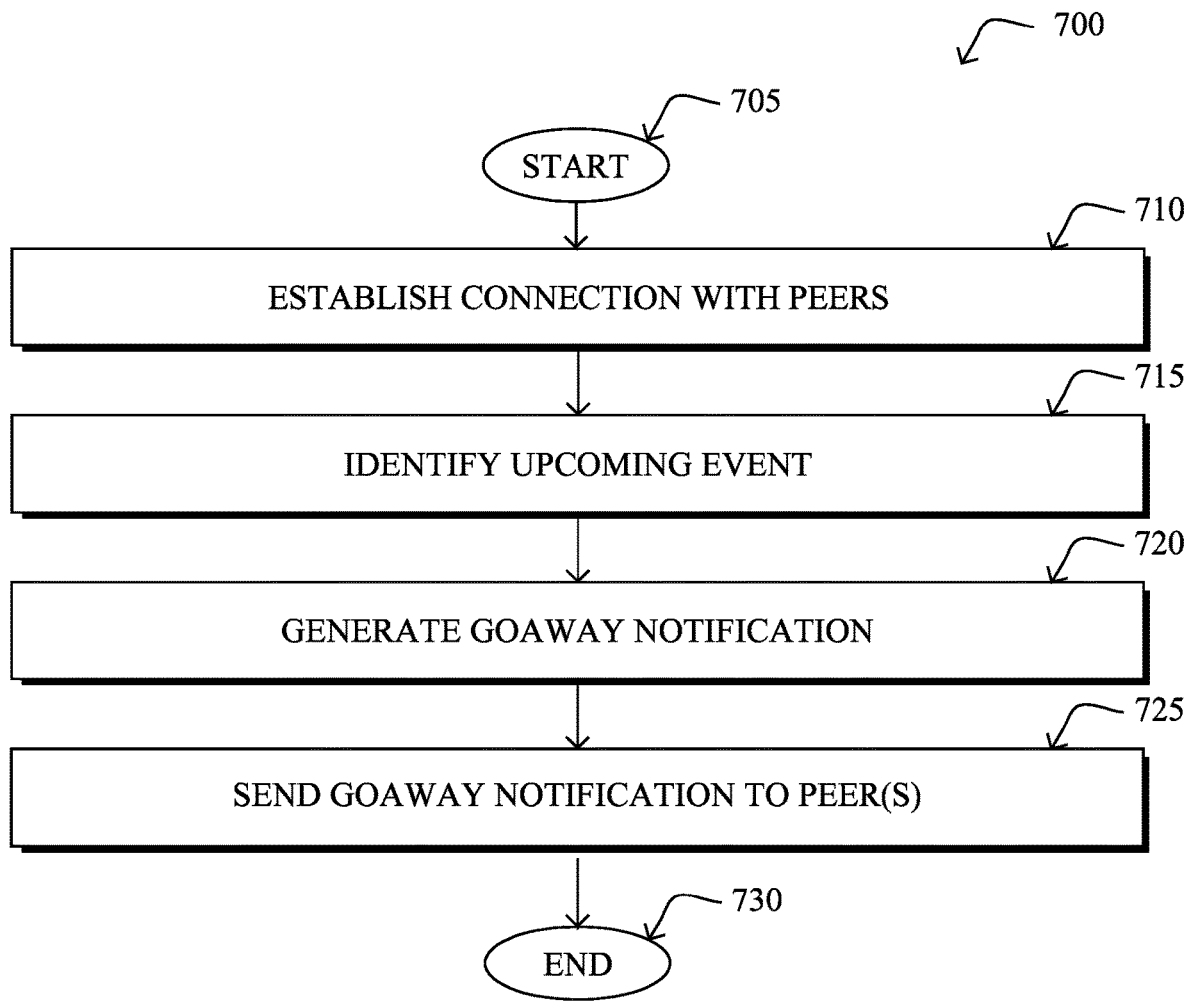
FIG. 7 illustrates an example simplified procedure for leveraging GOAWAY messages to inform a connection peer of an IoT event.

FIG. 7 illustrates an example simplified procedure for leveraging GOAWAY messages to inform a connection peer of an IoT event, in accordance with one or more embodiments described herein. For example, a non-generic, specifically configured IoT device (e.g., device 200) may perform procedure 700 by executing stored instructions (e.g., process 248). The procedure 700 may start at step 705, and continues to step 710, where, as described in greater detail above, the device may establish connections with a plurality of peers. For example, an autonomous vehicle may join a 'pod' of vehicles traveling together down a roadway that share sensor data with one another regarding the environment (e.g., to detect hazards in the road, the flow of traffic, spacing between the vehicles, etc.).

At step 715, as detailed above, the device may identify an IoT event involving the device. As would be appreciated, the event may be an upcoming event or already occurring event. In addition, any number of different IoT events may be identified. For example, upcoming IoT events may include an upcoming roaming event, an upcoming power down event, or an upcoming sleep event. Other example events may include a drop in sensor accuracy or a drop in sensor validity.

At step 720, the device may generate a GOAWAY message that includes metadata regarding the event within a metadata field of the message, as described in greater detail above. In general, the GOAWAY message indicates that the IoT device is not accepting new connections. In various embodiments, the GOAWAY message may be an HTTP/3 message, a QUIC message, or even part of an IPv6 extension header. In further embodiments, the device may select one or more of the peers of the device for receipt of the GOAWAY message, based on the identified event, and include identifiers for the connections or streams associated with those peers. For example, the GOAWAY message may include connection IDs or, in the case of IPv6, use a triplet comprising a flow label, a source IPv6 address, and a destination IPv6 address, as the connection ID.

At step 725, as detailed above, the device may send the GOAWAY message to one or more of the peers. In turn, depending on the type of IoT event and the metadata regarding the event, the receiving peer(s) may handle data from the device differently. For example, if the metadata specifies a back-off time associated with the IoT event, the receiving peer(s) may simply ignore data from the device during this time. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce a GOAWAY notification approach that can be achieved with a single message, instead of multiple messages for each connection. In addition, the techniques herein allow for metadata regarding an IOT to be sent, to provide context for the event to the peer(s) of the sender. Notably, the GOAWAY notification structure introduced herein is specifically tailored to report IoT events and can be used with any number of different protocols, such as QUIC, HTTP, and IPv6. The techniques herein also allow for the set of connections to be defined dynamically, to inform only specific sets of peers of an event, accordingly.

While there have been shown and described illustrative embodiments that provide for dynamically tracking/modeling systems according to risk level, it is to be understood that various other adaptations and modifications may be made within the spirit and scope of the embodiments herein. For example, while certain protocols are shown, such as QUIC, HTTP, and IPv6, other suitable protocols may be used to convey a GOAWAY message, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   establishing, by an Internet of Things (IoT) device in a network, connections with a plurality of peers;
   identifying, by the IoT device, an event involving the IoT device;
   generating, by the IoT device, a GOAWAY message that includes a 32-bit Error Code field, a Connection ID field, a 16-bit Reason Phrase Length field, and a variable-length Reason Phrase field, wherein the Reason Phrase field includes metadata regarding the event, and wherein the GOAWAY message indicates that the IoT device is not accepting new connections; and
   sending, by the IoT device, the GOAWAY message to one or more of the peers.

2. The method as in claim 1, wherein the upcoming event comprises one of: an upcoming roaming event, an upcoming power down event, or an upcoming sleep event.

3. The method as in claim 1, wherein the upcoming event comprises one of: a drop in sensor accuracy or a drop in sensor validity.

4. The method as in claim 1, wherein the GOAWAY message is a HyperText Transfer Protocol version 3 (HTTP/3) message.

5. The method as in claim 1, wherein generating the GOAWAY message comprises:

selecting the one or more peers from among the plurality of peers, based on the identified event; and including connection identifiers (IDs) for the connections between the IoT device and the selected one or more peers in the GOAWAY message.

6. The method as in claim 5, wherein each connection IDs comprises a flow label, a source Internet Protocol version 6 (IPv6) address, and a destination IPv6 address.

7. The method as in claim 1, wherein the metadata specifies a back-off time used by the one or more peers to adjust how they handle data from the IoT device during the back-off time.

8. The method as in claim 7, wherein the one or more peers ignore data from the IoT device during the specified back-off time.

9. The method as in claim 1, wherein the 32-bit Error Code field of the GOAWAY message is associated with the event.

10. An apparatus, comprising:
one or more network interfaces to communicate with a network;
a processor coupled to the network interfaces and configured to execute one or more processes; and
a memory configured to store a process executable by the processor, the process when executed configured to:
  establish connections with a plurality of peers;
  identify an event involving the apparatus;
  generate a GOAWAY message that includes a 32-bit Error Code field, a Connection ID field, a 16-bit Reason Phrase Length field, and a variable-length Reason Phrase field, wherein the Reason Phrase field includes metadata regarding the event, and wherein the GOAWAY message indicates that the apparatus is not accepting new connections; and
  send the GOAWAY message to one or more of the peers.

11. The apparatus as in claim 10, wherein the upcoming event comprises one of: an upcoming roaming event, an upcoming power down event, or an upcoming sleep event.

12. The apparatus as in claim 10, wherein the upcoming event comprises one of: a drop in sensor accuracy or a drop in sensor validity.

13. The apparatus as in claim 10, wherein the GOAWAY message is a HyperText Transfer Protocol version 3 (HTTP/3) message.

14. The apparatus as in claim 10, wherein the apparatus generates the GOAWAY message by:
selecting the one or more peers from among the plurality of peers, based on the identified event; and
including connection identifiers (IDs) for the connections between the apparatus and the selected one or more peers in the GOAWAY message.

15. The apparatus as in claim 14, wherein each connection IDs comprises a flow label, a source Internet Protocol version 6 (IPv6) address, and a destination IPv6 address.

16. The apparatus as in claim 10, wherein the metadata specifies a back-off time used by the one or more peers to adjust how they handle data from the apparatus during the back-off time.

17. The apparatus as in claim 16, wherein the one or more peers ignore data from the apparatus during the specified back-off time.

18. The apparatus as in claim 10, wherein the 32-bit Error Code field of the GOAWAY message is associated with the event.

19. A tangible, non-transitory, computer-readable medium storing program instructions that cause a device to execute a process comprising:
establish connections with a plurality of peers;
identifying, by the IoT device, an event involving the IoT device;
generating, by the IoT device, a GOAWAY message that includes a 32-bit Error Code field, a Connection ID field, a 16-bit Reason Phrase Length field, and a variable-length Reason Phrase field, wherein the Reason Phrase field includes metadata regarding the event, and wherein the GOAWAY message indicates that the IoT device is not accepting new connections; and
sending, by the IoT device, the GOAWAY message to one or more of the peers.

20. The computer-readable medium as in claim 19, wherein generating the GOAWAY message comprises:
selecting the one or more peers from among the plurality of peers, based on the identified event; and
including connection identifiers (IDs) for the connections between the IoT device and the selected one or more peers in the GOAWAY message.

* * * * *